United States Patent
Ehrstedt et al.

(10) Patent No.: US 6,901,065 B1
(45) Date of Patent: May 31, 2005

(54) PACKET TRANSMISSION IN A UMTS NETWORK

(75) Inventors: Björn Ehrstedt, Esbo (FI); Jouko Hyväkkä, Espoo (FI); Charles Lignell, Sjundeå (FI); Reijo Matinmikko, Espoo (FI); Janne Peisa, Helsinki (FI); Osmo Pulkkinen, Kirkkonummi (FI); Carl Göran Schultz, Pargas (FI); Raul Söderström, Kyrkslätt (FI); Stefan Henrik Andreas Wager, Würselen (DE); Toomas Wigell, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1149 days.

(21) Appl. No.: 09/678,717

(22) Filed: Oct. 4, 2000

(30) Foreign Application Priority Data

Oct. 19, 1999 (GB) .............................. 9924764

(51) Int. Cl.[7] .............................................. H04Q 7/28
(52) U.S. Cl. ...................... 370/341; 370/331; 370/468
(58) Field of Search ................................ 370/328, 330, 370/331, 338, 340–341, 349, 389, 395.4, 401, 468; 455/436, 432.1; 718/102, 103

(56) References Cited

U.S. PATENT DOCUMENTS

| | | | |
|---|---|---|---|
| 5,850,607 A | * 12/1998 | Muszynski | .................. 455/442 |
| 5,923,650 A | 7/1999 | Chen et al. | .................. 370/331 |
| 6,230,013 B1 | * 5/2001 | Wallentin et al. | ............ 455/436 |
| 6,442,388 B1 | * 8/2002 | Lopez et al. | ................. 455/436 |
| 6,574,473 B2 | * 6/2003 | Rinne et al. | .................. 455/436 |
| 6,594,492 B2 | * 7/2003 | Choi et al. | .................... 455/436 |
| 6,745,032 B1 | * 6/2004 | Alvesalo et al. | ............. 455/436 |

FOREIGN PATENT DOCUMENTS

WO     WO99/41850     8/1999

OTHER PUBLICATIONS

Nortel Networks Editor. "TS 25.401 UTRAN Overall Description V2.0.0". TSG–RAN Meeting #5. TSGR#5(99)442. Oct. 1999.

International Search Report for PCT/EP00/09782, Feb. 28, 2001, 4 pages.

* cited by examiner

*Primary Examiner*—Ricky Ngo
*Assistant Examiner*—Rhonda Murphy

(57) ABSTRACT

A method of scheduling packets for transmission over the air interface of a UMTS Terrestrial Radio Access Network (UTRAN) in the case where a pair of Radio Network Controllers (RNCs) are acting as separate serving and controlling (drift) RNCs for a mobile terminal. The method comprises sending from the controlling RNC to the serving RNC, allocated scheduling priorities together with packet sizes accepted for transmission with those priorities by the controlling RNC. Subsequently the serving RNC send to the controlling RNC, packets of sizes accepted by the serving RNC together with respective allocated priorities.

8 Claims, 3 Drawing Sheets

US 6,901,065 B1

PACKET TRANSMISSION IN A UMTS NETWORK

FIELD OF THE INVENTION

The present invention relates to packet transmission in a Universal Mobile Telecommunications System (UMTS) network and more particularly to the scheduling of packets for transmission over the air interface of a UMTS network.

BACKGROUND TO THE INVENTION

The European Telecommunications Standardisation Institute (ETSI) is currently in the process of standardising a new set of protocols for mobile telecommunications systems. The set of protocols is known collectively as the Universal Mobile Telecommunications System (UMTS). FIG. 1 illustrates schematically a UMTS network 1 which comprises a core network 2 and a UMTS Terrestrial Radio Access Network (UTRAN) 3. The UTRAN 3 comprises a number of Radio Network Controllers (RNCs) 4, each of which is coupled to a set of neighbouring Base Transceiver Stations (BTSs) 5. Each BTSs 5 is responsible for a given geographical cell and the controlling RNC 4 is responsible for routing user and signalling data between that BTS 5 and the core network 2. All of the RNCs are coupled to one another. A general outline of the UTRAN 3 is given in Technical Specification TS 25.401 V2.0.0 (1999-09) of the 3rd Generation Partnership Project, ETSI.

User and signalling data may be carried between an RNC and a mobile terminal (referred to in UTRAN as User Equipment (UE)) using Radio Access Bearers (RABs). Typically, a mobile terminal is allocated one or more Radio Access Bearers (RABs) each of which is capable of carrying a flow of user or signalling data. RABs are mapped onto respective logical channels. At the Media Access Control (MAC) layer, a set of logical channels is mapped in turn onto a transport channel, of which there are two types: a "common" transport channel which is shared by different mobile terminals and a "dedicated" transport channel which is allocated to a single mobile terminal. One type of common channel is a Forward Access CHannel (FACH). A basic characteristic of a FACH is that it is possible to send one or more fixed size packets per transmission time interval (10, 20, 40, or 80 ms). However, in any one given time interval all of the transmitted packets must be of the same length. Several transport channels (e.g. FACHs) are in turn mapped at the physical layer onto a Secondary Common Control Physical CHannel (S-CCPCH) for transmission over the air interface between a BTS and a mobile terminal.

When a mobile terminal registers with an RNC, via a BTS, that RNC acts at least initially as both the serving and controlling RNC for the mobile terminal. The RNC both controls the air interface radio resources and terminates the layer 3 intelligence (Radio Resource Control (RRC) protocol), routing data associated with the mobile terminal directly to and from the core network. FIG. 2 illustrates the protocol model for the FACH transport channel when the serving and controlling RNCs are coincident and where Uu indicates the interface between UTRAN and the mobile terminal (UE), and Iub indicates the interface between the RNC and a NodeB (where NodeB is a generalisation of a BTS). It will be appreciated that the MAC (MAC-c) entity in the RNC transfers MAC-c Packet Data Units (PDUs) to the peer MAC-c entity at the mobile terminal, using the services of the FACH Frame Protocol (FACH FP) entity between the RNC and the NodeB. The FACH FP entity adds header information to the MAC-c PDUs to form FACH FP PDUs which are transported to the NodeB over an AAL2 (or other transport mechanism) connection. An interworking function at the NodeB interworks the FACH frame received by the FACH FP entity into the PHY entity.

Consider now the situation which arises when a mobile terminal leaves the area covered by a RNC with which the terminal is registered, and enters the area covered by a second RNC. Under the UTRAN protocols, the RRC remains terminated at the first RNC whilst the terminal takes advantage of a cell and common transport channel of the second RNC. Thus, the first RNC remains as the serving RNC with a connection to the core network whilst the second RNC becomes the controlling RNC. The controlling RNC is in control of the NodeB where the mobile terminal is located and in particular of the logical resources (transport channels) at that NodeB. In this scenario the controlling RNTC is referred to as a "drift" RNC (the controlling RNC will also be acting as a serving RNC for mobile terminals registered with that RNC). The protocol model for the FACH transport channel when the serving and controlling RNCs are separate is illustrated in FIG. 3. It will be noted that a new interface Iur is exposed between the serving and the controlling RNCs. An Iur FACH FP is used to interwork the Common MAC (MAC-c) at the controlling RNC with the Dedicated MAC (MAC-d) at the serving RNC.

In both of the scenarios illustrated in FIGS. 2 and 3, an important task of the MAC-c entity is the scheduling of packets (MAC PDUs) for transmission over the air interface. If it were the case that all packets received by the MAC-c entity were of equal priority (and of the same size), then scheduling would be a simple matter of queuing the received packets and sending them on a first come first served basis. However, UMTS defines a framework in which different Quality of Services (QoSs) may be assigned to different RABs. Packets corresponding to a RAB which has been allocated a high QoS should be transmitted over the air interface as a high priority whilst packets corresponding to a RAB which has been allocated a low QoS should be transmitted over the air interface as a lower priority. Priorities are determined at the MAC entity (MAC-c or MAC-d) on the basis of RAB parameters.

UMTS deals with the question of priority by providing at the controlling RNC a set of queues for each FACH. The queues are associated with respective priority levels. An algorithm is defined for selecting packets from the queues in such a way that packets in the higher priority queues are (on average) dealt with more quickly than packets in the lower priority queues. The nature of this algorithm is complicated by the fact that the FACHs which are sent on the same physical channel are not independent of one another. More particularly, a set of Transport Format Combinations (TFCs) is defined for each S-CCPCH, where each TFC comprises a transmission time interval, a packet size, and a total transmission size (indicating the number of packets in the transmission) for each FACH. The algorithm must select for the FACHs a TFC which matches one of those present in the TFC set.

STATEMENT OF THE INVENTION

A possible problem arises where the controlling RNC is a drift RNC. This is because the MAC-d entity exists at the serving RNC, and it is the MAC-d entity which allocates priorities to packets, based upon the packet scheduling algorithm used by that RNC (when acting as a controlling RNC). The allocated priorities and packet sizes may not however conform with the packet scheduling algorithm used by the drift RNC. Packets received at the drift RNC from the serving RNC may not therefore be dealt with with an appropriate priority.

According to a first aspect of the present invention there is provided a method of scheduling packets for transmission over the air interface of a UMTS Terrestrial Radio Access Network (UTRAN) in the case where a pair of Radio Network Controllers (RNCs) are acting as separate serving and controlling RNCs for a mobile terminal, the method comprising:

sending from the controlling RNC to the serving RNC, allocated scheduling priorities together with packet sizes accepted for transmission with those priorities on transport channels by the controlling RNC; and subsequently sending from the serving RNC to the controlling RNC packets of sizes accepted by the serving RNC together with respective allocated priorities.

Embodiments of the present invention ensure that a serving RNC allocates a packet size to a given priority which is acceptable to the controlling RNC, avoiding a mis-match between priority and packet size at the controlling RNC.

Preferably, the information sent from the controlling RNC to the serving RNC comprises a set of allocated priorities, each having one or more associated package sizes, for each of a plurality of logical channel types to be mapped onto a transport channel at the controlling RNC. More preferably, said information comprises such a set for each logical channel type to be mapped onto a transport channel at the controlling It will be appreciated that the packet sizes which may be allocated to priorities may change, depending for example upon the load in a cell serving the mobile terminal or in the event that the mobile terminal moves into another cell controlled by the same controlling RNC. Preferably therefore, a new list of packet sizes and priorities may be sent from the controlling RNC to the serving RNC under appropriate circumstances.

Preferably, the list of priorities and packet sizes is received at the serving RNC by the RRC entity. More preferably, the list is sent in a RNSAP message.

Preferably, a packet received at the controlling RNC is placed in a queue for transmission on a Forward Access CHannel (FACH), the queue corresponding to the priority level attached to the packet and to the size of the packet. The FACH is mapped onto a S-CCPCH at a Base Transceiver Station (BTS) or other corresponding node of the UTRAN. More preferably, the packets for transmission on the FACH are associated with either a Dedicated Control CHannel (DCCH) or to a Dedicated traffic CHannel (DTCH).

Preferably, each FACH is arranged to carry only one size of packets. This need not be the case however, and it may be that the packet size which can be carried by a given FACH varies from one transmission time interval to another.

A given priority may be allocated one or more packet sizes, defined in the list sent to the serving RNC.

According to a second aspect of the present invention there is provided a UMTS Terrestrial Radio Access Network (UTRAN) comprising a plurality of interconnected Radio Network Controllers (RNCs), wherein, when a mobile terminal has separate serving and controlling RNCs, the controlling RNC is arranged to send to the serving RNC, packet sizes accepted for transmission by the controlling RNC together with allocated relative priorities which may be attached to those accepted packets sizes, and the serving RNC is arranged to send to the controlling RNC data packets having sizes accepted by the serving RNC, together with respective allocated priorities.

DETAILED DESCRIPTION OF A PREFERRED EMBODIMENT

Figure 1:
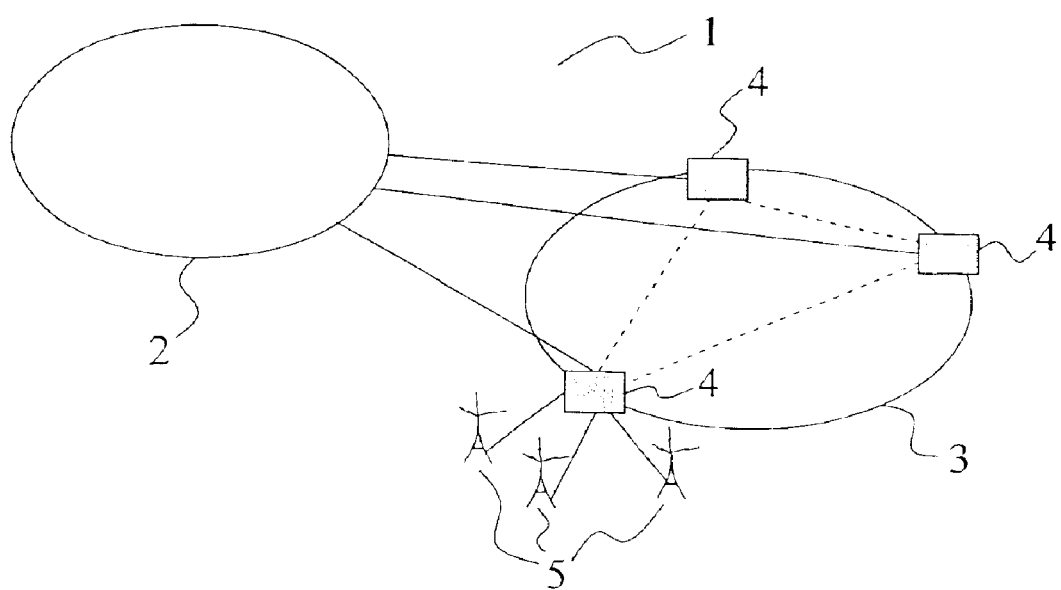
FIG. 1 illustrates schematically a UMTS network comprising a core network and a UTRAN.
Figure 2:
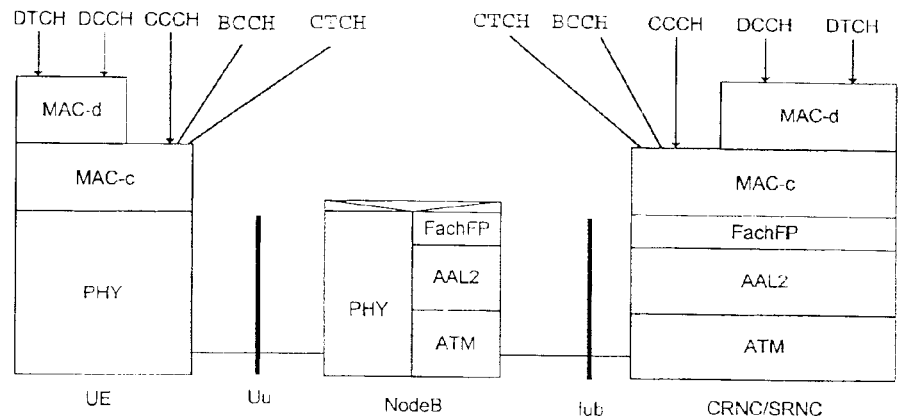
FIG. 2 illustrates a protocol model for a FACH transport channel when serving and controlling RNCs of the UTRAN of FIG. 1 are coincident.

The general structure of a UMTS network has been described above with reference to the schematic drawing of FIG. 1. Protocol models for the FACH transport channel have also been described with reference to FIGS. 2 and 3 for the cases where the serving RNC and controlling RNC are both coincident and separate.

Figure 3:
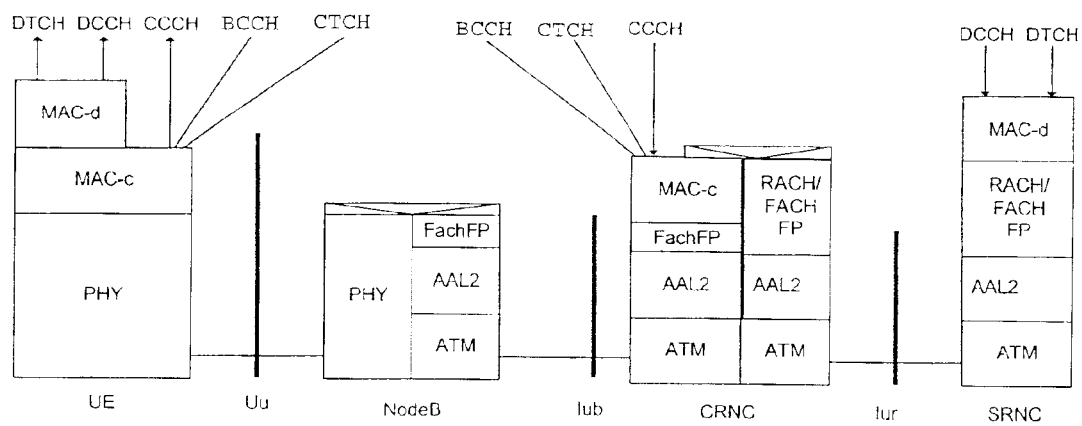
FIG. 3 illustrates a protocol model for a FACH transport channel when serving and controlling RNCs of the UTRAN of FIG. 1 are separate.
Figure 4:
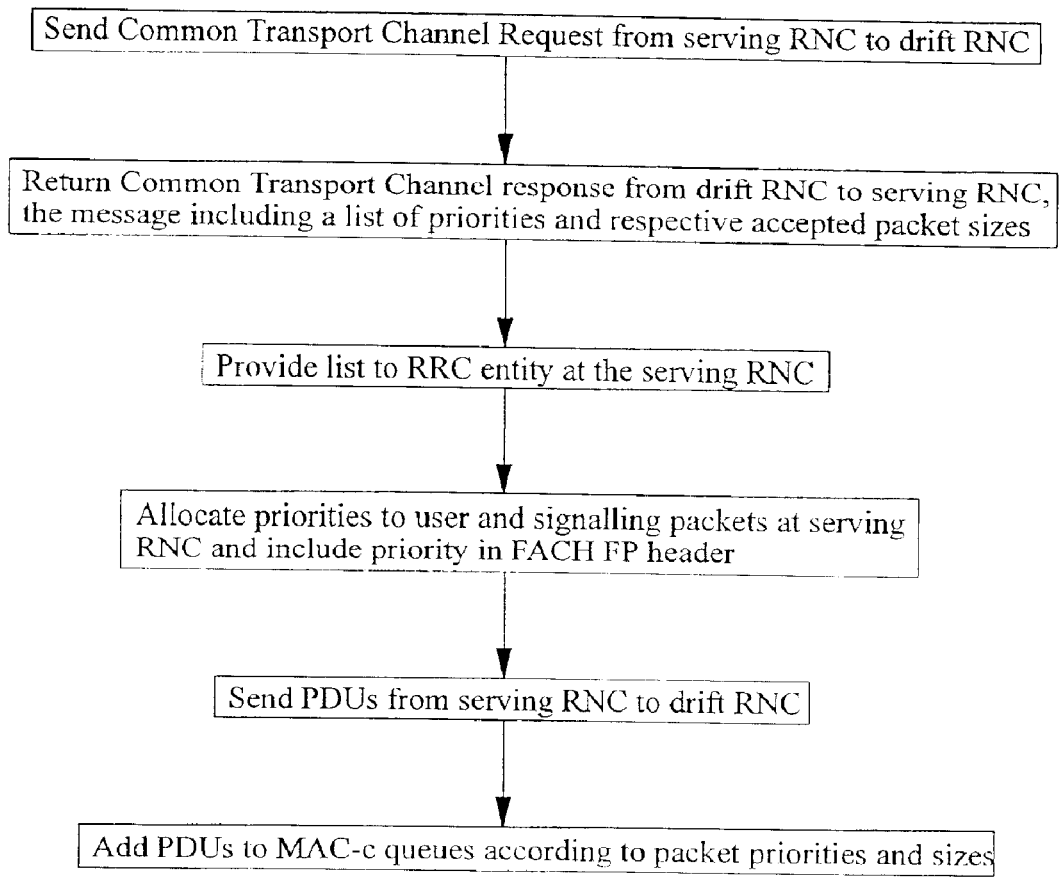
FIG. 4 is a flow diagram illustrating a method of scheduling packets for transmission at a controlling RNC of the UTRAN of FIG. 1.

Considering the scenario illustrated in FIG. 3, where a mobile terminal communicates with the core network of a UMTS system via separate serving and controlling (or drift) RNCs within the UTRAN, signalling and user data packets destined for the mobile terminal are received at the MAC-d entity of the serving RNC from the core network and are "mapped" onto logical channels, namely a Dedicated Control CHannel (DCCH) and a Dedicated traffic CHannel (DTCH). The MAC-d entity constructs MAC Service Data Units (SDUs) comprising a payload section containing logical channel data and a MAC header containing amongst other things a logical channel identifier.

The MAC-d entity passes the MAC SDUs to the FACH Frame Protocol (FP) entity. This entity adds a further FACH FP header to each MAC SDU, the FACH FP header including a priority level which has been allocated to the MAC SDU by a Radio Resource Control (RRC) entity. The RRC is notified of available priority levels, together with an identification of one or more accepted packet sizes for each priority level, following the entry of a mobile terminal into the coverage area of the drift RNC. At that time, the controlling RNC issues a resource request to the drift RNC. More particularly, this request is a Common Transport Channel Request having the following form:

| Information element | Reference | Type |
| --- | --- | --- |
| Message type | | M |
| Transaction ID | | M |
| D-RNTI | | M |
| Cell Id | | M |
| Transport Bearer Request Indicator | | M | where "M" indicates a mandatory field.

The drift RNC responds to receipt of the resource request by returning a response message (RNSAP), referred to as a Common Transport Channel Response, having the following form:

| Information element | Reference | Type |
|---|---|---|
| Message type | | M |
| Transaction ID | | M |
| Common Transport Channel Information | | |
| Common Transport Channel Priority Indicator | | M |
| Common Transport Channel Initial Window size | | M |
| Common Transport Channel Data Frame Size | | |
| Data Frame Size | | M |
| Transport Layer Address | | O |
| Binding Identity | | O |
| DL Channelisation Code | | O | where again "M" indicates a mandatory field and "O" indicates an optional field. The RNSAP message contains a list of priorities accepted by the drift RNC, together with an identification of one or more accepted packet sizes for each priority. Such a list may be sent for each logical channel type although this need not be the case. The list of priorities is sent to each MAC-d entity connected to the MAC-c entity in the drift RNC. For example, the list may define that for SDUs having a priority 1, a MAC-d entity may use packet sizes of 80 or 320 bits. Where a priority/packet size list is provided for each logical channel type, the RNSAP message used to carry the list contains a logical channel type identifier directly after the Common Transport Channel information.

The priority/packet size list is typically sent from the drift RNC to the serving RNC when a mobile terminal first enters the coverage area of a new RNC whilst being previously registered with another RNC. An updated list may be exchanged between the drift RNC and the serving RNC when the terminal moves between cells of the new RNC to reflect the priorities available at the new BTS. It will also be appreciated that an updated list may be sent even when a mobile terminal remains within a given cell, due to changing circumstances such as changes in the levels of traffic in the cell or a reconfiguration of the radio network resources.

The RRC examines the received RNSAP message and carries out any necessary reconfiguration of the MAC-d entity. A reconfiguration of the Radio Link Control (RLC) entity (which resides above the MAC-d layer in the serving RNC and is responsible for the segmentation of data) additionally takes place.

The FACH FP packets are sent to a peer FACH FP entity at the drift RNC over an AAL2 connection. The peer entity decapsulates the MAC-d SDU and identifies the priority contained in the FRAME FP header. The SDU and priority are passed to the MAC-c entity at the controlling RNC. The MAC-c layer is responsible for scheduling SDUs for transmission on the FACHs. More particularly, each SDU is placed in a queue corresponding to its priority and size (if there are 16 priority levels there will be 16 queue sets for each FACH, with the number of queues in each set depending upon the number of packet sizes accepted for the associated priority). As described above, SDUs are selected from the queues for a given FACH in accordance with some predefined algorithm (so as to satisfy the Transport Format Combination requirements of the physical channel).

It will be appreciated by those of skill in the art that various modifications may be made to the above described embodiments without departing from the scope of the present invention. For example, the above embodiment requires the sending of a priority/packet size list in an RNSAP message. In an alternative embodiment, a RNC may issue a "global" list covering all mobile terminals using that RNC as a drift RNC.

What is claimed is:

1. A method of scheduling packets for transmission over the air interface of a UMTS Terrestrial Radio Access Network (UTRAN) in the case where a pair of Radio Network Controllers (RNCs) are acting as separate serving and controlling RNCs for a mobile terminal, the method comprising:

sending from the controlling RNC to the serving RNC, allocated scheduling priorities together with packet sizes accepted for transmission with those priorities by the controlling RNC; and subsequently sending from the serving RNC to the controlling RNC packets of sizes accepted by the serving RNC together with respective allocated priorities.

2. A method according to claim 1, wherein the information sent from the controlling RNC to the serving RNC comprises a set of allocated priorities, each having one or more associated package sizes, for each of a plurality of logical channel types to be mapped onto a transport channel at the controlling RNC.

3. A method according to claim 2, wherein said information comprises such a set for each logical channel type to be mapped onto a transport channel at the controlling RNC.

4. A method according to claim 1, wherein a new list of packet sizes and priorities is sent from the controlling RNC to the serving RNC to replace an old list, following a change in circumstances at the controlling RNC.

5. A method according to claim 1, wherein the list of priorities and packet sizes is received at the serving RNC by a MAC-d entity.

6. A method according to claim 5, wherein the list is sent to the serving RNC in a RNSAP message.

7. A method according to claim 1, wherein a packet received at the controlling RNC is placed in a queue for transmission on a Forward Access CHannel (FACH), the queue corresponding to the priority level attached to the packet and to the size of the packet.

8. A UMTS Terrestrial Radio Access Network (UTRAN) comprising a plurality of interconnected Radio Network Controllers (RNCs), wherein, when a mobile terminal has separate serving and controlling RNCs, the controlling RNC is arranged to send to the serving RNC, packet sizes accepted for transmission by the controlling RNC together with allocated relative priorities which may be attached to those accepted packets sizes, and the serving RNC is arranged to send to the controlling RNC data packets having sizes accepted by the serving RNC, together with respective allocated priorities.

* * * * *

UNITED STATES PATENT AND TRADEMARK OFFICE
CERTIFICATE OF CORRECTION

PATENT NO. : 6,901,065 B1
APPLICATION NO. : 09/678717
DATED : May 31, 2005
INVENTOR(S) : Ehrstedt et al.

It is certified that error appears in the above-identified patent and that said Letters Patent is hereby corrected as shown below:

In Column 2, Line 18, delete "RNTC" and insert -- RNC --, therefor.

In Column 3, Line 29, after "controlling" insert -- RNC. --.

Signed and Sealed this

Thirtieth Day of October, 2007

JON W. DUDAS
*Director of the United States Patent and Trademark Office*